March 21, 1967 — R. L. SMIRL — 3,310,141
ELECTROMAGNETIC CLUTCH
Filed Nov. 30, 1964 — 3 Sheets-Sheet 2

INVENTOR.
Richard L. Smirl
By Joseph W. Malleck
Atty

March 21, 1967 R. L. SMIRL 3,310,141
ELECTROMAGNETIC CLUTCH
Filed Nov. 30, 1964 3 Sheets-Sheet 3

INVENTOR.
Richard L. Smirl
By Joseph W. Malleck
Atty.

United States Patent Office 3,310,141
Patented Mar. 21, 1967

3,310,141
ELECTROMAGNETIC CLUTCH
Richard L. Smirl, La Grange Park, Ill., assignor to Borg-Warner Corporation, Chicago, Ill., a corporation of Illinois
Filed Nov. 30, 1964, Ser. No. 414,527
3 Claims. (Cl. 192—84)

This invention relates to electromagnetic friction devices and more particularly to an electromagnetic clutch useful in controlling the operation of an automotive air-conditioning compressor.

In the automotive art, the necessity for a clutch having considerable compactness which is useful for the control of an air-conditioning system, is apparent. In such art, the high volume of production places particular emphasis upon simplicity and economy of construction as well as durability of design.

A primary object of this invention is to provide an electromagnetic clutch having armature means which is mounted upon a flexible member having a plurality of arcuately shaped arms arranged in a spiral configuration, said flexible member being effective to place a generally constant retracting load upon the armature throughout different degrees of deflection, while at the same time maintaining good torque transmission with minimum stock thickness of the flexible member.

Another object of this invention is to provide an electromagnetic friction device having a pair of mating pole faces, each face being comprised of a metallic ring having a plurality of arcuate slots formed therein, the slots on opposite rings being arranged to lie in non-aligned relation when the faces are brought into frictional contact.

Another object of this invention is to provide an electromagnetic clutch device in conformity with the above objects, the device having an improved slip ring construction and terminal with added protection from external damage by provision of a unique projecting lip formed as part of the core-ring element.

Other objects and advantages of this invention will become apparent from the following detailed description taken in connection with the accompanying drawings, in which;

FIGURE 3 is an isolated view of the armature and output element;

Figure 1:
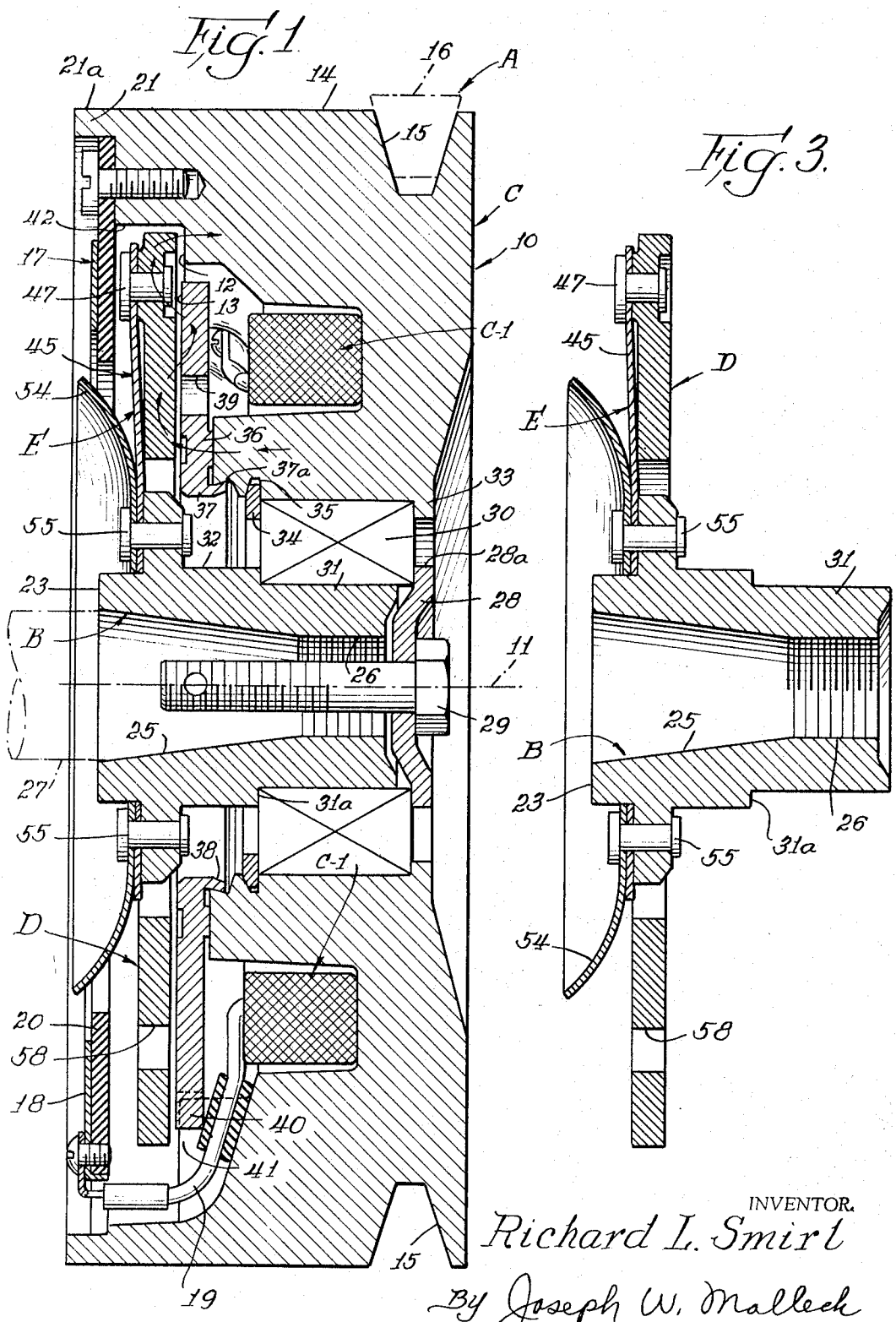
FIGURE 1 is a central sectional elevational view of an electromagnetic device embodying the principles of this invention, and showing in broken outline other elements with which the device cooperates.

Turning now to the drawings and more particularly to FIGURE 1, the electromagnetic device, broadly designated 10, comprises rotative input means A, rotative output means B, and a core-ring element C drivingly associated with the input means A and carrying electrical coil means C–1 effective to energize said core-ring element. An annular armature D is provided having spaced pole faces effective to be brought itno frictional contact with pole faces of the core-ring element upon energization of the coil means C–1; a retraction means E drivingly associates the armature with the output means B.

In more particularity, the core-ring element C comprises a body of ferro-magnetic material having an annular configuration with a generally U-shaped cross section, the ends of the U extending generally axially with respect to the axis 11 of the device, and has flat term-surfaces 12 and 13 thereon cooperating to define a pair of radially-spaced pole faces lying in a common plane. The outer cylindrical periphery 14 of the core-ring element is provided with a groove 15 for receiving the rotative input means A, here a belt 16 and which cooperates therewith to provide rotative drive. A slip ring construction and terminal assembly 17 is mounted adjacent to the radially outer periphery of the core-ring element and comprises metal ring 18 secured on an insulator 20 fastened to the element C and has appropriate electrical lead wires 19 extending between said ring 18 and the coil means C–1 disposed within said core-ring element. The core-ring element has an integral annular axially extending lip 21 effective to extend over and enclose the slip ring and terminal assembly 17, the surface 21a of the lip being common with the surface 14 of element C.

The output means B comprises a hub 23 journalling the retraction means E, the hub has an annular flange 24 extending radially and an internal conical socket 25 concentric with axis 11 and resolving into a threaded bore 26 to which may be fastened an output shaft 27 by such means as a retainer disc 28 and cap screw 29 assembly, the cap screw extending centrally thereinto. The core-ring element C is here shown as mounted upon the output means hub 23 by a bearing 30 held in axial position between said elements by the shoulder 31a of a recess 31 provided in the outer surface 32 of the output hub 23 and the retainer disc 28 having a protruding annular lip 28a; the upper portion of bearing 30 is maintained in axial position relative to the core-ring by inwardly depending annular lip 33 and a snap ring 34 positioned in a groove 35 so as to engage the opposite side of the bearing.

Figure 2:
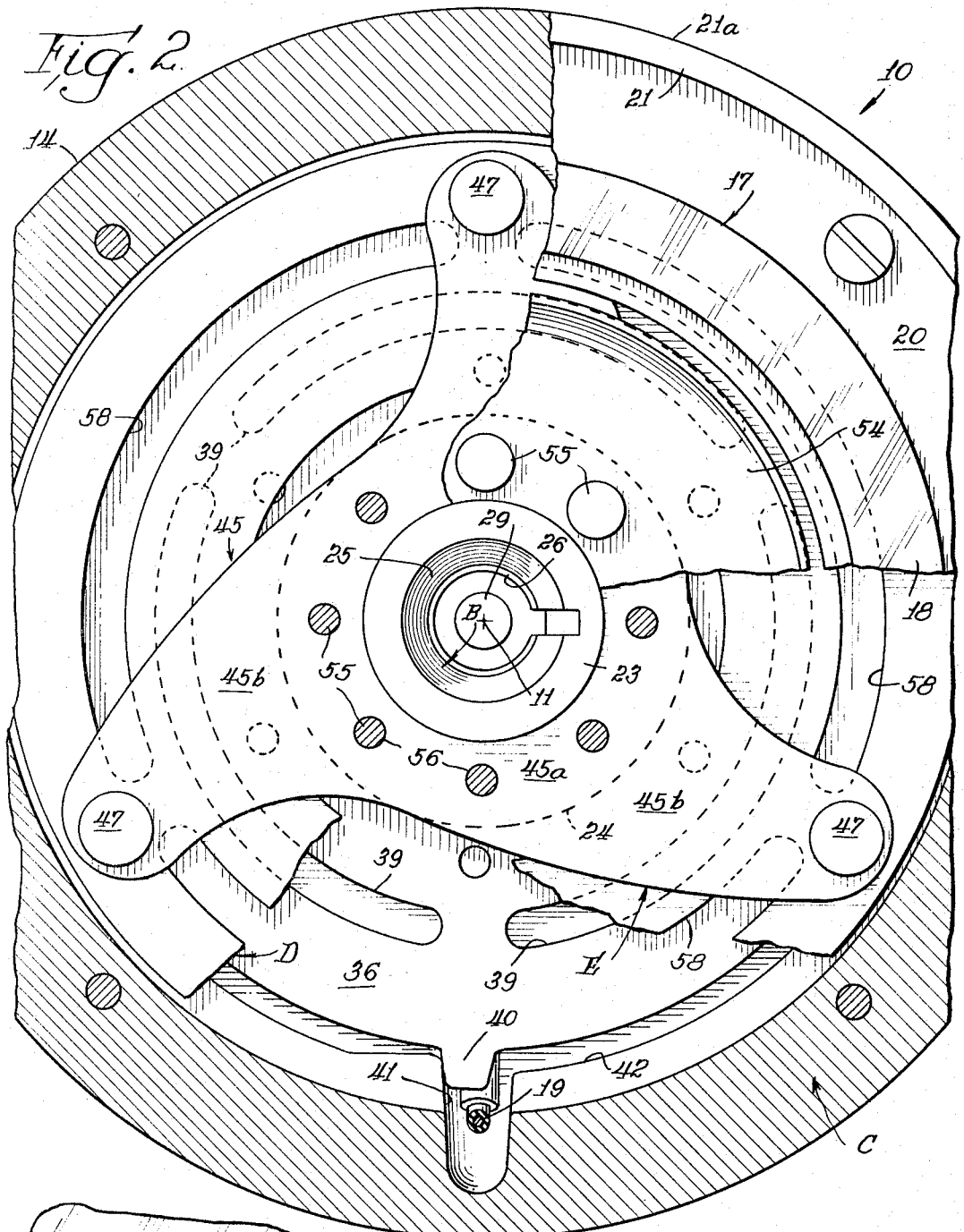
FIGURE 2 is an end elevational view of the device shown in FIGURE 1, with certain portions thereof broken away.
Figure 2A:
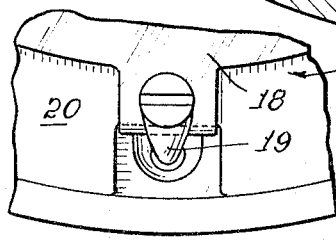
FIGURE 2A is a fragmentary view of the device of FIGURE 1.
Figure 4:
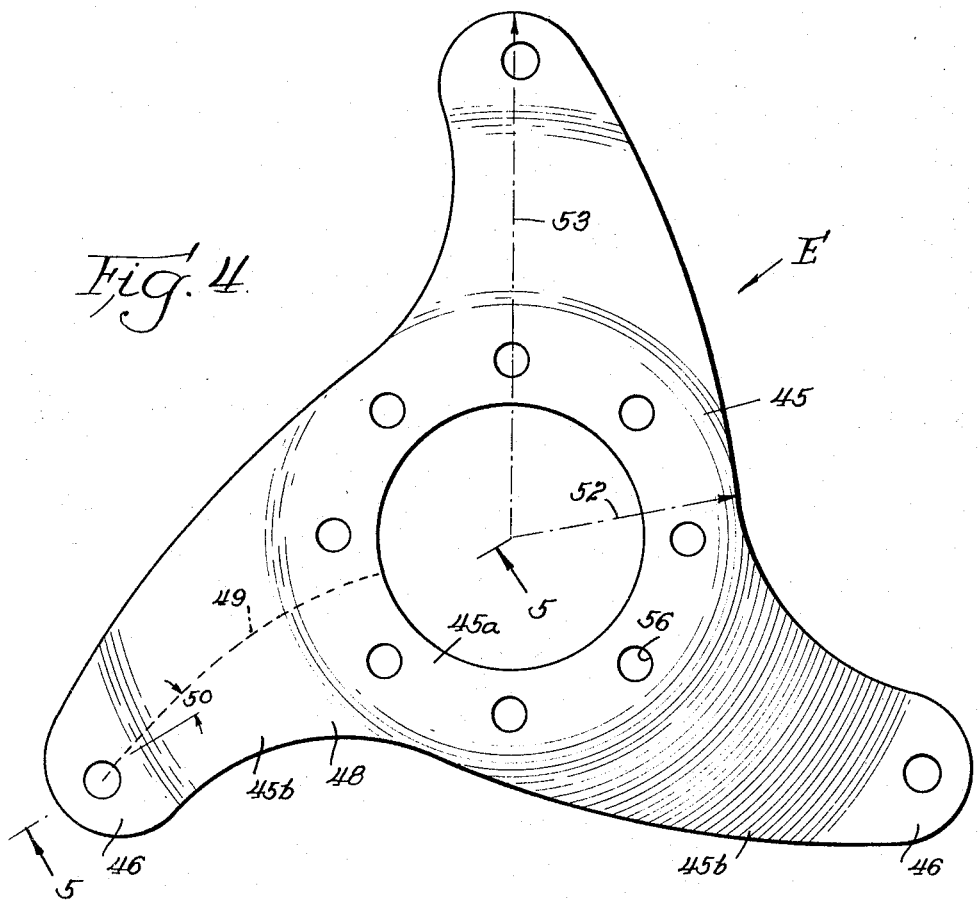
FIGURE 4 is an isolated view of the retraction means.
Figure 5:
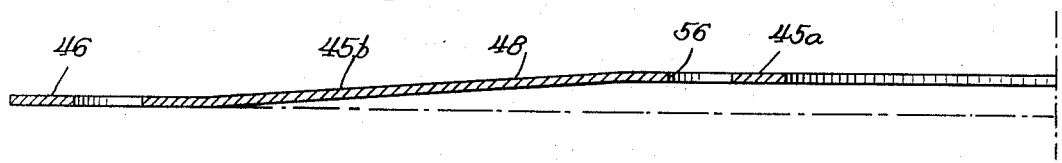
FIGURE 5 is an edge view of the retraction means of FIGURE 4.

To provide the major pole face or surface 13 for the core-ring element, a ferro-magnetic annular plate 36 is employed having an inner annular periphery 37 provided with an axially extending lip 37a; said lip is effective to be swaged radially outwardly against conical surface 38 by appropriate tooling after being nested with the core-ring element resulting in a conically shaped lip shown in FIGURE 1. Plate 36 has a plurality of arcuately shaped slots 39 provided therein and has boss 40 for keying the core-ring element therewith, the boss extending into groove 41 formed in the interior surface 42 of the core-ring (see FIGURE 2).

The retraction means E comprises a member 45 formed from a single ply of sheet metal having a specific contour effective to incorporate beneficial effects of a Belleville spring while at the same time combining the advantages of a strap drive employed between two rotative members. To this end, retraction means has a central web 45a of a generally circular flat plate configuration having a plurality of radiating arms 45b terminating in radially outer portions 46 which are fastened at circumferential spaced points 47 on the outer face of the armature ring D. The portion 48 of the arm 45b joining to the central web 45a of the retraction means has a mean directional line 49 substantially radially; the outer portion 46 of each arm, which is attached to the armature ring, has the mean directional line forming an included angle 50 with a radius at that location which is approximately 30 to 45 degrees. The radius 52 of the web portion, taken from the axis of rotation 11 of the output means E is less than one half and more than one third the radius 53 of the outer periphery of the arms. The web 45a is fastened to the hub flange 24 by a plurality of fasteners 55 extending through equi-circumferentially spaced openings 56.

A cup-shaped oil slinger 54 is also fastened to the single ply retraction means E as illustrated in FIGURE 1.

Operation of the electromagnetic friction device, to achieve a clutch engaged condition, depends upon energization of coil means C-1 by way of introducing electric power through the slip-ring assembly 17. Such energization sets up a flux path (indicated by arrows in FIGURE 1) between the armature D and the core-ring element C. The flux path promotes an electromagnetic traction therebetween and due to the particular non-aligned positioning of slots 39 of plate 36 and slots 58 of armature D, the path weaves several times therebetween. Disengagement is achieved by de-energizing coil means C-1 whereby the retraction means E may effectively exert its spring tendencies to return to its original slightly conical configuration as shown in FIGURE 1. During engagement the cross sectional shape of the retraction means E is substantially flat and moves to a more pronounced conical shape during disengagement.

Employment of the retraction means E, which is a hybrid between a Belleville type spring and typical tangentially disposed drive-straps, and the combination of the protecting lip 21a for the slip-ring assembly 17, provides an improved electromagnetic clutch device which is characterized by simplicity and more reliable operation.

While I have described my invention in connection with one specific embodiment thereof, it is to be understood that this is by way of illustration and not by way of limitation, and the scope of my invention is defined solely by the appended claims, which should be constructed as broadly as the prior art will permit.

I claim:

1. An electromagnetic friction device, comprising; input and output means, a core-ring element of ferro-magnetic material having a pair of spaced annular pole pieces and electrical coil means carried therein adapted for being energized, an armature ring element of ferro-magnetic material having a pair of pole pieces effective to frictionally engage the pole faces of said core-ring element, a resilient retractor drivingly coupling said armature with one of said output or input means and being particularly characterized by a central annular web having a plurality of radiating arms, said web and arms having a preformed Belleville spring configuration effective to normally maintain said armature out of contact with said core-ring element, said web of said retractor is drivingly secured to said input or output means at a radially inner portion thereof and the radially outer portion of each of said arms is drivingly connected at circumferentially spaced portions to said armature ring element, each of said arms having an arcuate configuration defined so that the inner portion of each arm is substantially radially directed and the outer portion of each arm is generally directed to form an included angle with a radius passing through said outer portion which is 45 degrees, said arm being gradually curved between said inner and outer arm portions.

2. An electromagnetic friction device as in claim 1, in which said retractor has the radius of said web less than one half and more than one third the radius of the outer portion of said arms.

3. An electromagnetic friction device, the combination comprising; a core-ring element of ferro-magnetic material having a pair of spaced annular pole pieces and a conical surface and internally disposed coil means, one of said pole pieces being defined by an annular plate having a plurality of arcuate slots formed therein and a radially inner periphery carrying an annular lip effective to extend about and against said conical surface of said core-ring element; rotative input means drivingly connected to said core-ring element; electromagnetic armature means carrying a pair of radially spaced pole pieces and effective to frictionally contact the pole pieces of said core-ring element when brought together in response to energization of said coil means, said armature means being comprised of an annular ring having a plurality of arcuate slots formed therein, said slots of said armature means being offset relative to said slots of said core-ring plate so that upon frictional contact therebetween, said slots will be non-aligned; rotative output means journalling said core-ring element; and retractor means drivingly interconnecting said output means with said armature means and particularly comprising a thin sheet metal Belleville spring member having a central web drivingly connected to said output means at a radially inner portion thereof and a plurality of outwardly spiralling arms, each having an outer portion drivingly connected at spaced circumferential locations to said armature means.

References Cited by the Examiner
UNITED STATES PATENTS

| 2,325,193 | 7/1943 | Nutt et al. | 192—68 X |
| 2,407,757 | 9/1946 | Mac Cullum | 192—84 |
| 2,714,437 | 8/1955 | Spase | 192—89 |
| 2,751,056 | 6/1956 | Aumuller et al. | 192—84 |
| 2,965,203 | 12/1960 | White | 192—84 X |
| 2,966,977 | 1/1961 | Johnson | 192—89 X |
| 3,036,679 | 5/1962 | Millington et al. | 192—84 |
| 3,162,285 | 12/1964 | Sala | 192—84 |
| 3,189,150 | 6/1965 | Chapman | 192—84 |
| 3,190,419 | 6/1965 | Heidorn | 192—84 |
| 3,251,444 | 5/1966 | Erban | 192—84 |

DAVID J. WILLIAMOWSKY, *Primary Examiner.*

A. T. McKEON, *Assistant Examiner.*